June 12, 1962 — G. C. SEAVEY — 3,038,498
HYDRAULIC AMPLIFIER
Filed Sept. 25, 1956

Inventor:
Gordon C. Seavey
By: Joseph R Dwyer
Atty.

з,038,498
HYDRAULIC AMPLIFIER
Gordon C. Seavey, Hingham, Mass., assignor, by mesne assignments, to Borg-Warner Corporation, Chicago, Ill., a corporation of Illinois
Filed Sept. 25, 1956, Ser. No. 612,023
4 Claims. (Cl. 137—623)

This invention relates to hydraulic control apparatus and more particularly to hydraulic amplifier devices or servo systems in which a control member may be moved a small distance by a relatively weak source to obtain proportional movement of a controlled member and of a hydraulic pressure fluid utilization device.

One of the applications for hydraulic amplifiers or servo mechanisms of this type is the controlling of hydraulic fluid flow to a hydraulic motor in accordance with a relatively weak electric input signal. This relatively weak input signal, as received by a torque motor, positions a pilot or control valve which controls a main or controlled valve, and which in turn controls the flow of hydraulic fluid under pressure to the hydraulic motor. Systems of this type are utilized in high performance aircraft control systems where information is fed into the system in the form of electric impulses from an electronic source, such as gun firing computers, navigational or remote flight control centers, the electrical input signal is then converted into controlled flow of hydraulic fluid under pressure to position and control the aircraft, missiles, artillery and the like.

Heretofore, one of the major problems in hydraulic amplifier devices or servo systems of this type is to obtain a precise linear and instantaneously responsive relationship between the electrical input to the torque motor and the output flow from the device. One such attempt is a mechanical feed back linkage between the control valve and the main valve so that movement of the main valve (and thereby flow to the hydraulic motor) is reflected mechanically back to the control valve. Such mechanical systems with spring levers cause variations in output flow due to variations in spring forces and the build up of hydraulic pressures necessary to overcome initial spring forces cause lag, and therefore, resulting in low frequency oscillatory operation.

Other attempts to accomplish linear and instantaneous response in such systems is the provision of electrical indicating systems to indicate the position of the control valve with respect to the controlled valve and vice versa but the complexity of these systems make them undesirable.

Obviously, still other systems may be used, such as electro-pneumatic systems or all electric systems utilizing a plurality of servo motors but such systems either lack true linear and fast response or are too complex or too cumbersome to be desirable.

Too, in these prior art devices no provision was made for sensing the actual flow to and from the servo system and for transmitting such information back to the control valve in such a manner that flow output is precisely controlled.

It is therefore a principal object of my invention to provide an improved hydraulic amplifier device which converts and amplifies, in linear and instantaneous relationship, input signals into hydraulic output flow.

A further object of my invention is to provide a hydraulic amplifier device having a flow sensing means which measures accurately the actual flow, either under high flow or low flow conditions and transmits such information to a control valve so that the hydraulic flow output is linearly responsive to the electronic input signal.

I propose to accomplish the above objects by the provision of an electro hydraulic servo valve comprising a control valve responsive to an electric torque motor whereby displacement of the control valve by the torque motor from a center or null position causes movement of a controlled valve from a center or null position the rate of said movement being proportional to the amount of displacement of the control valve which in turn causes fluid under pressure to flow from the servo system through either of a pair of outlets. A flow sensing mechanism having a variable orifice is disposed in one of the outlets and between the hydraulic motor being actuated in such a manner that flow to and from the servo system is sensed. The upstream and downstream pressure drop across the variable orifice is in fluid communication with the control valve whereby movement of the control valve is accomplished according to the amount of flow from the servo system.

Further objects and advantages of my invention will become apparent from the following detailed description thereof taken in conjunction with the accompanying drawings which forms a part thereof and wherein.

Figure 1:
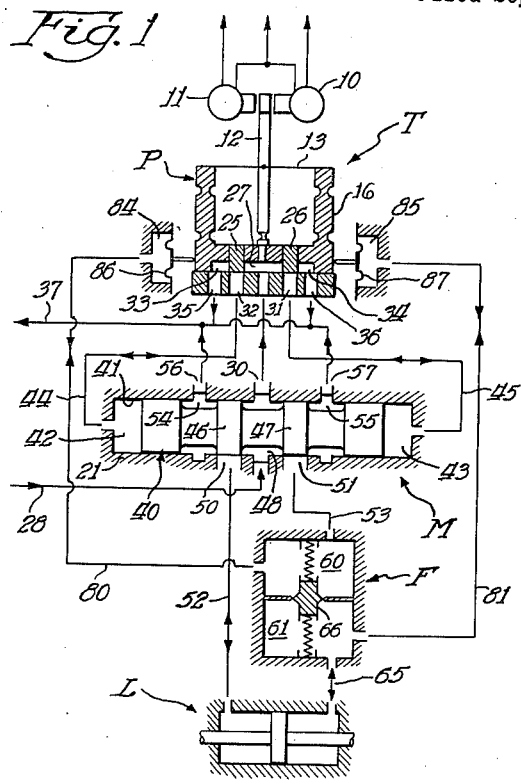
FIGURE 1 is a schematic view, partly in section, of one embodiment of my hydraulic amplifier constructed in accordance with the teachings of my invention and showing to advantage the flow sensing device hydraulically coupled therein.

Turning now to FIGURE 1, there is shown schematically a torque motor T, mechanically coupled to a first stage, pilot or control valve P, which in turn controls second stage, main or controlled valve M. In a manner to be described in more detail hereinafter displacement of the pilot valve P to the right or to the left from its central or null position in turn effects displacement of the main valve M from its center or null position so that a flow of fluid to a hydraulic load device L causes said device to move to the right or to the left. The flow to and from the load L is measured and caused to be regulated through the operation of flow sensing device F.

Torque motor T comprises generally a pair of solenoids 10 and 11 with one end of an elongated armature-like member 12 disposed therebetween. Said armature-like member 12 is supported substantially at its center point and pivots on a resilient diaphragm 13. The opposite end of the armature 12 is suitably attached to pilot valve P so that movement of one end of the armature-like member 12 by current through the solenoids 10 or 11 from a source of electric signals (not shown) causes movement of the pilot valve P to the right or to the left by reason of the lever action of the member 12 at its pivot point.

While I have shown one type of torque motor having a pivotal type armature supported on a resilient diaphragm, other types of torque motors may be used to move the pilot valve, the present motor being shown and described only by way of example.

Figure 2:
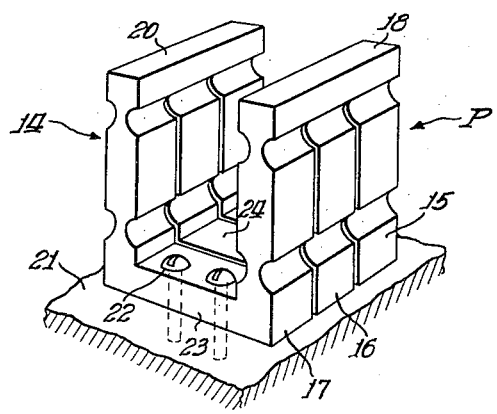
FIGURE 2 is an enlarged, detail, perspective view of a control valve disclosed schematically in FIGURE 1.

As more clearly shown in FIGURE 2, pilot valve P is a part of an assembly, indicated in its entirety as 14, comprising three inverted U-shaped members 15, 16 and 17 aligned in parallel, with the corresponding ends of each of the corresponding legs of each U-shaped member attached to and made part of a pair of parallel bars 18 and 20. U-shaped members 15 and 17 are fixedly attached to the housing 21, as by bolts 22, located in each of the crossbars (crossbar 23 of U-shaped member 17 only being shown so attached) forming the U-shaped member between the legs of the respective members 15 and 17. The crossbar 24 of the inner U-shaped member 16 being unattached to the housing 21, may slide to the left or to the right dependent upon the movement of the armature 12 to which it is connected, as hereinabove mentioned, and forms the control or pilot valve P. While the connection between the legs of U-shaped member 16 and parallel bars 18 and 20 is selected to permit the sliding movement of pilot valve P, the connection is also selected to have sufficient resiliency to cause the movement or return of the valve P to its center or null position when no current is in either of the solenoids 10 or 11 or any other forces are operating upon the valve P as will be more fully understood from the description hereinafter.

Returning now again to FIGURE 1 where U-shaped member 16 is shown, it can be seen that pilot valve P is provided centrally thereof with two valve lands 25 and 26 which form in cooperation with the housing a central pressure chamber 27, which is constantly in open fluid communication with a supply of fluid under pressure (not shown) through inlet passage 28 and passage 30. Movement of the pilot valve to the right or to the left will supply ports 31 or 32, respectively, with fluid pressure from the central pressure chamber 27 and, concurrently either of chambers 33 and 34 formed by lands 25 and 26 and the respective ends of the valve P, will be placed in communication with the sump (not shown) through passages 35 and 36 which in turn are connected to drain passage 37.

Main valve M, as shown in the drawings, is a type of valve comprising a spool 40 supported in a cylindrical bore 41 formed in the housing 21 and adapted to reciprocate to the right or to the left. Obviously housing 21, although shown as a single housing common to both the pilot valve P and the main valve M, may be separate housings for each valve, if desired. The ends of the bore 41 are closed by the ends of the spool 40 and provide spool valve pressure chambers 42 and 43 which cause movement of the spool 40 to the right or to the left according to the unbalance of pressures in said chambers. These chambers are placed in communication with ports 31 and 32, pilot valve control chamber 27, passages 44 and 45, respectively. Centrally of the ends of the spool 40 are a pair of valve lands 46 and 47 which form with the bore 41 a pressure chamber 48 which is supplied with hydraulic fluid under pressure from inlet passage 28. Movement of the spool valve 40 to the right or to the left according to the unbalance of pressures in the chambers 42 or 43, which unbalance is caused by the movement of the pilot valve to the right or to the left, will cause pressure fluid in chamber 48 to flow through either of ports 50 or 51 and thence to either of outlet passages 52 or 53. Chambers 54 and 55, formed by lands 46 and 47, bore 41 and ends of the spool valve, are respectively placed in fluid communication with drain passage 37 by passages 56 and 57.

Figure 3:
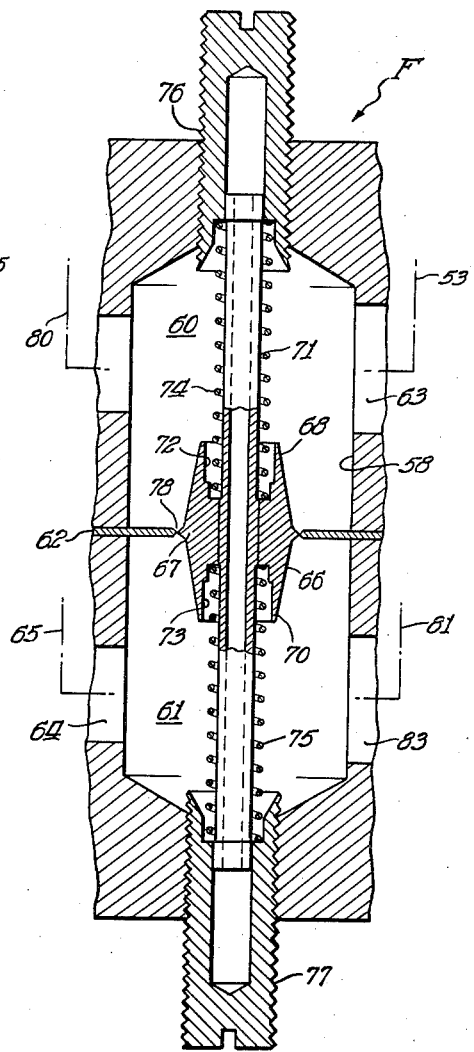
FIGURE 3 is an enlarged, detail, sectional view of the flow sensing device shown in FIGURE 1.

Flow sensor device, more clearly shown in the enlargement thereof in FIGURE 3 of the drawings, may be placed in either of outlet passages 52 or 53 and comprises generally a bore 58 which is divided into two chambers 60 and 61 by a centrally located, relatively thin ring-like member 62. Chambers 60 and 61 are provided with ports 63 and 64, one of which is connected with outlet passage 53 and the other of which is connected to passage 65, the latter being a continuation of outlet passage 53. As so disposed, dependent upon the position of spool valve 40, fluid may flow to or from port 63 and to or from port 64 from passages 53 and 65, respectively. Intermediate the chambers 60 and 61 is a flow responsive movable profile member 66 having a centrally enlarged portion 67 and a pair of reduced end portions 68 and 70. Movable member 66, in the embodiment shown, is centrally bored to slidably receive guide rod 71 which assists in guiding the movement of the member 66 in either direction according to the flow through the flow sensing device. Ends 68 and 70 are further counter-bored as shown at 72 and 73 to each receive one end of the pair of resilient compression springs 74 and 75. Spring 74 at its end opposite the movable member 66 is received in closure plug 76 and spring 65 at its end opposite the movable member 66 is received in closure plug 77. The position of closure plugs 76 and 77 with respect to the housing 21, each being threadably received therein, may initially position the profile movable member 66 with respect to the ring-like member 62 and may also be used to properly increase or decrease the compression of the respective springs in accordance with the desired sensibility of the profile movable member 66 to flow. As thus disposed, movable member 66 with respect to fixed ring-like member 62 provide a variable orifice 78 for the flow of fluid between chambers 60 and 61 and, in normal functioning of this flow sensing device, chambers 60 and 61 may become upstream and/or downstream pressure zones. Chambers 60 and 61 are placed in fluid communication with feed back passages 80 and 81 through ports 82 and 83, respectively. And thus, the upstream and/or downstream pressure difference between the two chambers 60 and 61 (assuming, of course, flow through the outlet passages 53 and 65) may be communicated through feed back passages 80 or 81 to feed back pressure chambers 84 and 85 formed in the housing 21 adjacent the pilot valve P. This difference in pressure in chambers 84 and 85, communicated to diaphragm members 86 and 87, which form part of the respective chambers 84 and 85 and which are in contacting relationship with pilot valve P, will cause movement of the pilot valve P to the right or to the left in opposition to the force from the torque motor.

As to the pair of diaphragm members 86 and 87, subject to pressure to move the pilot valve according to the upstream and downstream pressure in the flow sensor, plungers may be substituted therefor or pressure in the chambers could be directed against the ends of the pilot valve itself in a manner similar to the pressure acting on the ends of the spool valve 40, if desired. These two structures, i.e., the coil springs in the flow sensor valve and the diaphragms for movement of the pilot valve P, are shown merely by way of example herein.

Having thus described the structure of my hydraulic amplifier, I will now describe its operation.

With the torque motor T receiving no input signal from the electronic source, the pilot valve P is in its central or null position and the main valve M is in its central or null position so that fluid under pressure from inlet passage 28 pressurizes chamber 27 and 48 of the pilot valve P and main valve M, respectively. Upon receipt of a signal, for example, member 12 is caused to pivot moving the pilot valve to the left, as shown in the drawings. Fluid under pressure from the chamber 27 of the pilot valve P is admitted into port 32 and thence into chamber 42 of the main valve M through passage 44. Concurrently, fluid in chamber 43 at the opposite end of main valve M is vented to sump through passages 45, port 31, chamber 34, passage 36 and drain passage 37. This pressure difference between chambers 42 and 43 causes the main valve to move to the right, as shown in the drawing, opening port 51 to pressure chamber 48. Fluid under pressure is then admitted into outlet passage 53, through the flow sensing device F, and thence through passage 65 to the right side of load L. Concurrently, return fluid from the left side of load L flows through passage 52, through port 50, into drain chamber 54, passage 56 and drain passage 37. Since fluid is flowing through the flow sensing device F, the movable profile member 66 is caused to move downwardly, as shown in the drawing, in response thereto causing a high upstream pressure in chamber 60 and a low downstream pressure in chamber 61 the difference of which is transmitted through feed back passages 80 and 81, respectively, to feed back pressure chambers 84 and 85. This difference in pressure between chambers 84 and 85 acting upon their respective diaphragms 86 and 87 urge the pilot valve P toward its null position. It is to be noted at this point that the velocity of main valve M to the right is a function of the displacement of pilot valve P to the left since the flow rate to the chambers 32 and 33 is a function of the displacement of pilot valve P. This displacement of pilot valve P in turn, of course, is a function of the amount of force applied to the member 12 from the source of electronic signals. In the present example, the movement of the main valve M to the right will continue until the difference in pressure in the flow sensing upstream and downstream chambers 60 and 61 is sufficient to move the pilot valve P to null position. When the pilot valve reaches the null position by influence by the difference in pressure from the flow sensor device i.e., when the flow of fluid under pressure through outlet passage 53 has reached the required amount according to the displacement of pilot valve P by the torque motor T, the main valve M will then be in its final displaced position and will continue to remain there causing a constant flow of fluid to the right side of load L until load L is in its desired position at which time the electric input signal to the torque motor T will stop. Since there is an unbalance of pressure in chambers 84 and 85, pilot valve P will be urged by this difference in pressure (since there is no resistance from the torque motor at this time) to the right causing chamber 27 to communicate pressure through port 31, passage 45 to chamber 43 to move the spool valve M to the left. Concurrently, the displacement of pilot valve P opens chamber 42 on the opposite side of the spool valve M to drain through passage 44, port 32, chamber 33, passage 35 and drain passage 37. When the spool valve M has returned toward its null position sufficiently to close both ports 50 and 51 so that there is no flow of fluid into the outlet passage 53 and no return flow from outlet passage 52, the difference in pressure in the flow sensor valve chambers 60 and 61 is consequently reduced to zero which causes a balance of pressures in chambers 84 and 85 acting on diaphragm in 86 and 87. At this time, the resileincy of the connection of pilot valve P to the parallel bars 18 and 20 then causes the pilot valve P to return to its null position.

While I have described my invention in connection with a signal moving armature 12 of torque motor T in one direction, obviously a signal causing movement of member 12 in an opposite direction will cause operation of my invention in a similar manner but reversed as to direction of movement of the valve and flow.

It will be understood by those skilled in the art that the ability of my hydraulic amplifier to control the rate of flow to the load L is particularly useful in controlling the rate of movement of the load L regardless of its magnitude in accordance with the magnitude of the input signal to torque motor T, and the use of a variable orifice flow sensing device with a member of selected profile therein provides an accurate measurement of flow, at either high or low flow conditions, which accurate measurement is immediately reflected back to the pilot valve causing linear response of flow to the magnitude of the input signal.

Wherein the various parts of my invention have been referred to as located in a right or left, it will be understood that this is done solely for the purpose of facilitating description and that such references relate only to the relative positions of the parts as shown in the accompanying drawings.

Also, it is to be understood that many changes and modifications may be made without departing from the spirit and scope of the invention and the invention is designed and comprehended within the scope of the appended claims which should be given a scope consistent with the prior art.

I claim:

1. A hydraulic servo system comprising a control valve biased to a null position and movable therefrom in accordance with an input signal, a controlled valve, an inlet connecting a source of fluid pressure with said valves, a pair of outlets, means defining pressure chambers, fluid conduits interconnecting said control valve and said pressure chambers for communicating hydraulic pressure fluid to said chambers, said control valve being arranged upon displacement from said null position to unbalance the pressures in said chambers, said controlled valve being movable in response to said unbalance of pressures in said chambers and being arranged upon displacement from a null position to communicate said inlet with either of said pair of outlets, a flow sensing means in fluid communication with either of said outlets and so constructed and arranged to cooperate with said control valve to overcome said input signal thus positioning said controlled valve in its final displacement according to the desired flow to or from said outlets and to control movement of said control valve and cause movement of said controlled valve toward its null position upon discontinuance of said input signal, said flow sensing means comprising a fixed member and a movable member, said movable member being positioned with respect to the fixed member by spring means yet movable with respect thereto by flow through said outlets to define a variable orifice, and fluid conduits interconnecting said flow sensing means and said control valve.

2. A hydraulic servo system comprising a control valve biased to a null position and movable therefrom in accordance with an input signal, a controlled valve, an inlet connecting a source of fluid pressure with said valves, a pair of outlets, means defining pressure chambers, fluid conduits interconnecting said control valve and said pressure chambers for communicating hydraulic pressure fluid to said chambers, said control valve being arranged upon displacement from said null position to unbalance the pressures in said chambers, said controlled valve being movable in response to said unbalance of pressures in said chambers and being arranged upon displacement from a null position to communicate said inlet with either of said pair of outlets, a flow sensing means in fluid communication with either of said outlets and so constructed and arranged to cooperate with said control valve to overcome said input signal thus positioning said controlled valve in its final displacement according to the desired flow to or from said outlets and to control movement of said control valve and cause movement of said controlled valve toward its null position upon discontinuance of said input signal, said flow sensing means comprising means defining a variable orifice and responsive to flow through said outlets to provide an upstream high pressure zone and a downstream low pressure zone, and fluid conduits communicating the pressure in the respective high and low pressure zones to said control valve.

3. A hydraulic servo system comprising a control valve biased to a null position and movable therefrom in accordance with an input signal, a controlled valve, an inlet connecting a source of fluid pressure with said valves, a pair of outlets, means defining pressure chambers, fluid conduits interconnecting said control valve and said pressure chambers for communicating hydraulic pressure fluid to said chambers, said control valve being arranged upon displacement from said null position to unbalance the pressures in said chambers, said controlled valve being movable in response to said unbalance of pressures in said chambers and being arranged upon displacement from a null position to communicate said inlet with either of said pair of outlets, and a flow sensing means in fluid communication with either of said outlets and so constructed and arranged to cooperate with said control valve to overcome said input signal thus positioning said controlled valve in its final displacement according to the desired flow to or from said outlets and to control movement of said control valve and cause movement of said controlled valve toward its null position upon discontinuance of said input signal, said flow sensing means comprising a fixed member and a movable member cooperating to define a variable orifice and responsive to flow through said outlets to provide an upstream high pressure zone and a downstream low pressure zone, fluid conduits interconnecting said respective high and low pressure zones and said control valve.

4. A hydraulic servo system comprising a control valve biased to a null position and movable therefrom in accordance with an input signal, a controlled valve, an inlet connecting a source of fluid pressure with said valves, a pair of outlets, means defining pressure chambers, fluid conduits interconnecting said control valve and said pressure chambers for communicating hydraulic pressure fluid to said chambers, said control valve being arranged upon displacement from said null position to unbalance the pressures in said chambers, said controlled valve being movable in response to said unbalance of pressures in said chambers and being arranged upon displacement from a null position to communicate said inlet with either of said pair of outlets, and a flow sensing means in fluid communication with either of said outlets and so constructed and arranged to cooperate with said control valve to overcome said input signal thus positioning said controlled valve in its final displacement according to the desired flow to or from said outlets and to control movement of said control valve and cause movement of said controlled valve toward its null position upon discontinuance of said input signal, said flow sensing means comprising a fixed member and a movable member, said movable member being positioned with respect to the fixed member by spring means yet movable with respect thereto by flow through said outlets to define a variable orifice with an upstream high pressure zone and a downstream low pressure zone, fluid conduits interconnecting said high and low pressure zones and said control valve.

References Cited in the file of this patent

UNITED STATES PATENTS

| | | |
|---|---|---|
| 2,188,834 | Fischel et al. | Jan. 30, 1940 |
| 2,314,005 | Martin | Mar. 16, 1943 |
| 2,533,042 | Polson et al. | Dec. 5, 1950 |
| 2,629,226 | Polson | Feb. 24, 1953 |
| 2,654,348 | Beck | Oct. 6, 1953 |
| 2,771,062 | Hayner | Nov. 20, 1956 |

FOREIGN PATENTS

| | | |
|---|---|---|
| 609,808 | Great Britain | Oct. 7, 1948 |
| 640,642 | Great Britain | July 26, 1950 |